(12) United States Patent
Erickson et al.

(10) Patent No.: US 12,321,268 B2
(45) Date of Patent: Jun. 3, 2025

(54) FAR MEMORY ALLOCATOR FOR DATA CENTER STRANDED MEMORY

(71) Applicant: RAMBUS INC., San Jose, CA (US)

(72) Inventors: Evan Lawrence Erickson, Chapel Hill, NC (US); Christopher Haywood, Chapel Hill, NC (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 18/030,971

(22) PCT Filed: Oct. 11, 2021

(86) PCT No.: PCT/US2021/054417
§ 371 (c)(1),
(2) Date: Apr. 7, 2023

(87) PCT Pub. No.: WO2022/086746
PCT Pub. Date: Apr. 28, 2022

(65) Prior Publication Data
US 2023/0376412 A1    Nov. 23, 2023

Related U.S. Application Data

(60) Provisional application No. 63/093,855, filed on Oct. 20, 2020.

(51) Int. Cl.
*G06F 12/02*   (2006.01)
(52) U.S. Cl.
CPC ........ *G06F 12/0292* (2013.01); *G06F 12/023* (2013.01); *G06F 2212/154* (2013.01)
(58) Field of Classification Search
CPC ............... G06F 12/0292; G06F 12/023; G06F 2212/154; G06F 12/0692
(Continued)

(56) References Cited

U.S. PATENT DOCUMENTS 6,088,769 A    7/2000 Luick et al.
6,463,510 B1   10/2002 Jones et al.
(Continued)

OTHER PUBLICATIONS

Notification of Transmittal of the International Search Report and the Written Opinion of the International Searching Authority, or the Declaration with Mail Date Jan. 21, 2022 re: Int'l Appln. No. PCT/US2021/054417. 11 pages.
(Continued)

*Primary Examiner* — Hua J Song
(74) *Attorney, Agent, or Firm* — Womble Bond Dickinson (US) LLP (57) ABSTRACT

An integrated circuit device includes a first memory to support address translation between local addresses and fabric addresses and a processing circuit, operatively coupled to the first memory. The processing circuit allocates, on a dynamic basis as a donor, a portion of first local memory of a local server as first far memory for access for a first remote server, or as a requester receives allocation of second far memory from the first remote server or a second remote server for access by the local server. The processing circuit bridges the access by the first remote server to the allocated portion of first local memory as the first far memory, through the fabric addresses and the address translation supported by the first memory, or bridge the access by the local server to the second far memory, through the address translation supported by the first memory, and the fabric addresses.

19 Claims, 5 Drawing Sheets

(58) Field of Classification Search
USPC .......................................................... 711/170
See application file for complete search history.

(56) References Cited

U.S. PATENT DOCUMENTS

| | | |
|---|---|---|
| 6,470,429 B1 | 10/2002 | Jones et al. |
| 8,464,004 B2 | 6/2013 | Sugizaki et al. |
| 2013/0117621 A1 | 5/2013 | Saraiya et al. |
| 2016/0077976 A1 | 3/2016 | Raikin et al. |
| 2020/0379914 A1* | 12/2020 | Yudanov ................. H04L 67/12 |

OTHER PUBLICATIONS

Pinto, Christian et al., "Teleporting Memory Across Two Servers", IBM Research Blog, IBM Research Europe, Aug. 2020, https://www.ibm.com/blogs/research/2020/08/teleporting-memory-across-two-servers/, 11 pages.

* cited by examiner

FAR MEMORY ALLOCATOR FOR DATA CENTER STRANDED MEMORY

RELATED APPLICATION

This application claims the benefit under 35 U.S.C. § 119(e) of U.S. Provisional Application No. 63/093,855 filed on 20 Oct. 2020, the entire content of which is hereby incorporated by reference herein.

BACKGROUND

High resource utilization is critical for running large, cost-effective datacenters. Large amounts of DRAM in these datacenters is "stranded" at any point—customer inaccessible and unbilled—and this is increasing every year. Static memory allocation, even in localized virtual memory and virtual computing systems, does not solve the problem of stranded memory in a large distributed system such as a data center. Therefore, there is a need in the art for a technological solution which overcomes the drawbacks described above.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

This disclosure describes embodiments of a device (e.g., an integrated circuit device or chip), a far memory allocator (FMA), which enables the memory locally attached to one server to be allocated and accessed by other servers, forming a memory pool. The following features apply in various embodiments.

The far memory allocator allows each server to run one or more unique operating system or hypervisor instances in various embodiments. Embodiments of the far memory allocator do not require a global operating system (OS), although a global OS can be used in various embodiments. The far memory allocator may be accompanied by changes to the operating system/kernel to enable far memory access. The far memory allocator enables allocations and accesses to/from a memory fabric, i.e., the far memory allocator may act as a bridge, in various embodiments. The far memory allocator minimizes stranded memory in a datacenter by allowing such stranded memory to be dynamically allocated at the page level (in some embodiments) by individual virtual machines running on different servers. Further embodiments of the far memory allocator may dynamically allocate stranded memory at levels other than page level. Various embodiments of the far memory allocator use virtual addresses or physical addresses to access local memory for allocation as far memory. In one embodiment, virtual addresses are used to manage access to stranded memory in coordination with a process running on a hypervisor or operating system. In one embodiment, physical addresses are used to allocate pages of stranded memory in coordination with a hypervisor or operating system. In some embodiments of the far memory allocator, the use of virtual addresses or physical addresses for local memory to be allocated as far memory is selectable.

Use of the far memory allocator does not require major kernel modifications in an operating system or hypervisor, as the far memory allocator does not manage, nor interfere with operating system or hypervisor managing, physical memory or system page tables. The operating system or hypervisor will continue to manage physical memory or system page tables, and the far memory allocator will work in cooperation with the operating system or hypervisor.

One embodiment of the far memory allocator is further described below, in which the far memory allocator bridges CXL to Gen-Z with the ability to dynamically allocate pages of stranded local memory to other similar devices across a memory fabric. In one embodiment, the far memory allocator is a device connected to one or more processors via one or more cache coherent links. The far memory allocator acts as a bridge to and from a memory fabric and thereby enables and controls access to local memory, allocating addresses assigned by a hypervisor (e.g., VMM) or operating system to remote servers that maintain separate address spaces local to those remote servers.

In various embodiments, the far memory allocator simultaneously operates as a device with shared virtual memory and a memory controller while acting as a bridge to a memory fabric. The far memory allocator accesses local memory using virtual addresses in coordination with a process running on the local server, in some embodiments. The far memory allocator accesses local memory using physical addresses in coordination with a hypervisor (VMM)/operating system/kernel, in some embodiments. The far memory allocator can cache a portion of the memory allocated to the system to which it is directly attached, using such virtual addresses or such physical addresses in accordance with various embodiments, for performance. And, in various embodiments the far memory allocator maintains a pool of initialized local memory used to fulfill incoming access requests. The above features, in various combinations, are implemented in the embodiments described below and in further embodiments readily devised according to the teachings herein.

Figure 1:
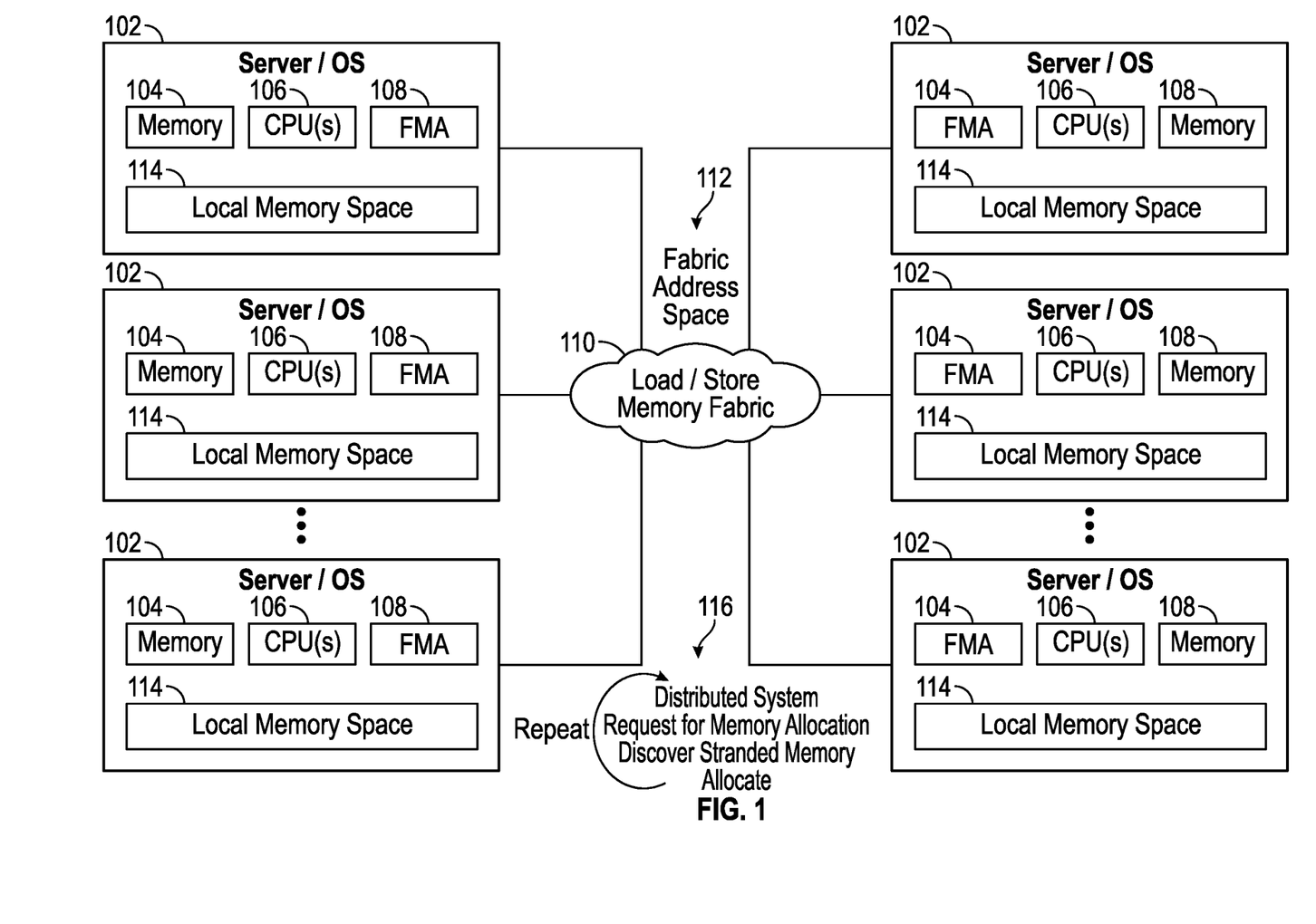
FIG. 1 illustrates a distributed system with multiple servers, in which far memory allocators discover local, stranded memory and allocate the local memory as far memory.

FIG. 1 illustrates a distributed system 116 with multiple servers 102, in which far memory allocators 108 discover local, stranded memory and allocate the local memory as far memory. In one scenario, the distributed system 116 is a data center with various servers 102 which need not be identical, and could have different operating systems, types and numbers of CPUs 106 and types and amounts of memory 104 on each server 102, i.e., a homogeneous or heterogeneous set of servers 102, coupled together by a load/store memory fabric 110 with a fabric address space 112.

In order to dynamically discover and reallocate stranded memory, the servers 102, and more specifically the FMAs 108 in the servers 102 of the distributed system 116 repeat the following actions. A server sends a request for memory allocation. The request is sent by a requester server, seeking a far memory allocation. At any given moment during operation, one or multiple requester servers 102 in the distributed system 116 may be seeking far memory allocation. Another server discovers stranded memory. At any given moment during operation, one or multiple donor servers may discover stranded memory. One or more donor servers allocates the discovered, stranded memory, through the load/store memory fabric 110. A far memory allocator in the donor server allocates local memory as far memory to be accessed by the requester's server through a far memory allocator in the requester server, as further described below in various embodiments.

Stranded memory is allocated, or reallocated, as far memory. A server 102, and more specifically an FMA 108 of that server 102 acts as a donor server (see FIG. 2), and provides the far memory, for use by a requester server (see also FIG. 2). The requester server accesses the far memory through the load/store memory fabric 110, addressing the far memory using a fabric address (or, more specifically, a range of fabric addresses) in the fabric address space 112. Each server 102 uses a portion of the memory 104 of that server 102 for local processes, and may allocate a portion of that memory 104 as far memory or another server 102. These processes are dynamic and change throughout the operation of the distributed system 116. At any given moment, a particular server 102 may be using all or most of its local memory 104. Or, most or even all of the local memory 104 of a server 102 may be allocated as far memory for one or more other servers 102, and anything in between is possible. The servers 102 operate in physical address space, or virtual address space, or combinations thereof, in various embodiments. For example, in one version of a distributed system 116, a data center operates multiple servers 102, each with virtual computing, one or more virtual machine managers (VMM) and/or one or more hypervisors. A server 102 could include a single computer, multiple computers, distributed computing or virtual computing implemented on physical computing resources, etc. An embodiment of the distributed system 116 discovers and allocates or reallocates stranded memory to homogeneous or heterogeneous servers 102 across the load/store memory fabric 110.

The FMA 108, in one embodiment, utilizes a cache coherent processor link, implemented according to CXL (Compute Express Link) and bridging to a load/store memory fabric 110 implemented according to Gen-Z. CXL supports the concept of an accelerator with shared virtual memory (SVM), a device that shares a virtual address space with a running process and can read/write to local memory. This utilizes address translation service (ATS) calls to the CPU, in some embodiments, to enable reads/write from the device directly to physical addresses. In another embodiment the FMA 108 utilizes a cache coherent processor link implemented according to OpenCAPI.

The FMA 108, utilizing either CXL or OpenCAPI or similar cache coherent processor link, may operate in remote memory controller mode, allowing the FMA 108 to receive load/stores to physical addresses. By simultaneously operating as an accelerator, a memory controller, and a bridge to a load/store memory fabric 110 (e.g., Gen-Z), the FMA 108 can dynamically enable page-level accesses to memory in other servers 102 in the datacenter.

In various embodiments, the FMA 108 enumerates to the Hypervisor/OS as if the FMA 108 were remote memory attached using CXL, OpenCAPI, etc., to one or more processors. This allows the Hypervisor/OS to use that memory for running processes. Further, this allows the Hypervisor/OS to (potentially) have no awareness that the processor(s) executing the hypervisor or OS is actually accessing remote memory, since all the remote aspect is completely abstracted away.

When the FMA 108 receives a read/write to the local physical address that the Hypervisor/OS has assigned to the FMA 108 (across the cache coherent link), the FMA 108 translates that local physical address into a fabric address through on-device page translation structures such as page tables and TLBs (translation lookaside buffers). This means the FMA 108 is bridging the local physical address space to a fabric address space. Which fabric address to use to map to a local physical address depends on what fabric address the FMA received from other similar devices during the remote memory allocation request.

Various embodiments of the FMA 108 enable CPU-attached local memory to be allocated and accessed at the page level by any server 102 in the datacenter or other distributed system 116. For improved performance, various optimizations can be made on various embodiments of the FMA 108. One optimization is that outgoing fabric accesses can be cached on the FMA 108. For this optimization, one embodiment of the FMA 108 has a cache in which data of outgoing fabric accesses is stored for repeated accesses in the cache. Another optimization is that, by maintaining a pool of pre-zeroed pages of local memory, a page fault can be avoided during allocation by a far server of local memory managed by FMA 108 using virtual addresses. In another optimization, when memory is freed, the local FMA 108 can zero the local memory and re-use the local memory or add the local memory to the pre-allocated pool without de-allocating the local memory from the far node. These and further optimizations are readily implemented in various embodiments of the FMA 108, in accordance with the teachings herein.

Figure 2:
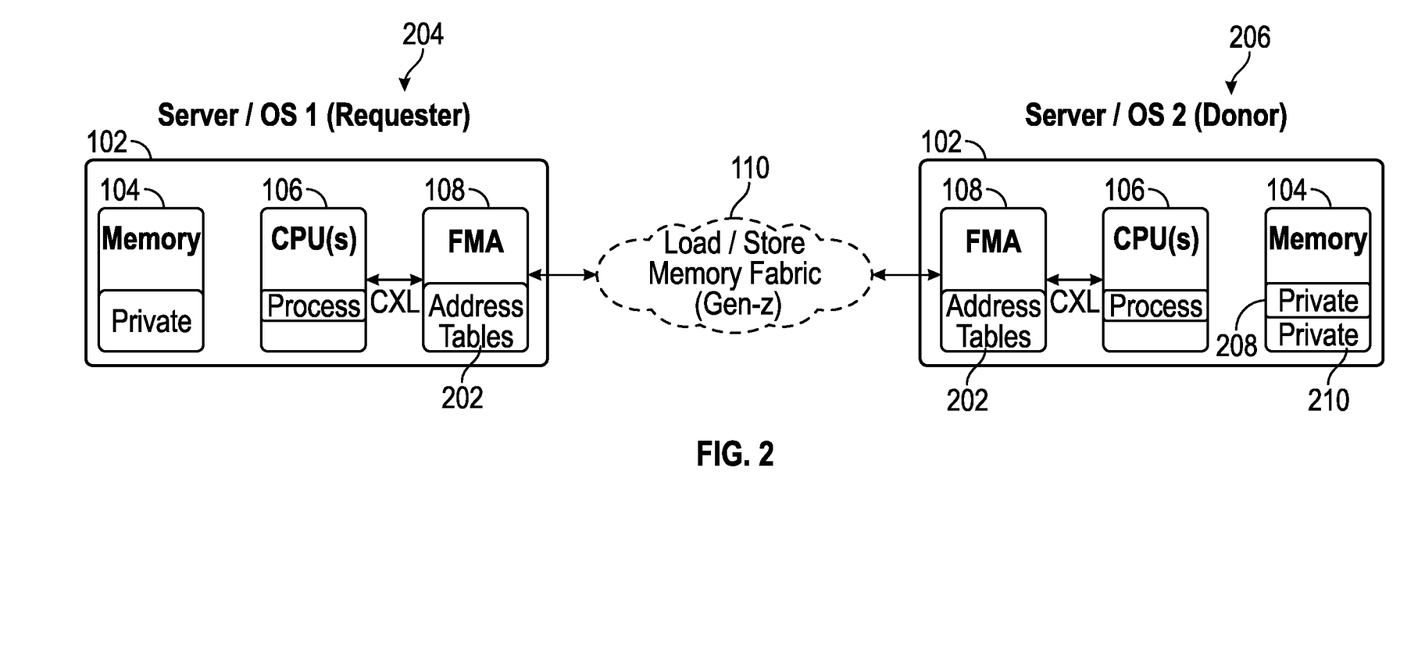
FIG. 2 illustrates a donor server allocating local memory as far memory for a requesting server to access through a load/store memory fabric.

FIG. 2 illustrates a donor 206 server 102 allocating local memory as far memory for a requesting (or requester 204) server 102 to access through a load/store memory fabric 110. Each server 102 has one or more CPUs 106, memory 104, and an FMA 108, and the servers 102 could be homogeneous or heterogeneous as described above. Embodiments with virtual memory and virtual addressing applied to physical memory resources, and physical memory addressing, are further described below. Memory 104 could be of various kinds, such as RAM, DRAM, storage class memory, etc., and is depicted as having one or more sections of memory considered private memory, associated with the CPU(s) 106 operating various processes. Each FMA 108 has one or more address tables 202, which are further described below.

In one scenario for FIG. 2, the requester 204 server 102 is using a portion of the local memory 104 in the requester 204 server 102 labeled "private" as local memory for one or more processes executing on one or more CPUs 106 in the requester 204 server 102. The donor 206 server 102 is using a portion 208 of the local memory 104 in the donor 206 server 102 labeled "private" as local memory for one or more processes executing on one or more CPUs 106 in the donor 206 server 102. Another portion 210 of the local memory 104 labeled "private" in the donor 206 server 102 is allocated as far memory for one or more processes executing on one or more CPUs 106 in the requester 204 server 102.

The two servers 102, requester 204 and donor 206, could be any two of the servers 102 depicted in FIG. 1, for example. It should be appreciated that each server, and FMA 108 within that server 102, can play either role as a requester or a donor, or could play both roles and be both requester and donor, for far memory, with other servers 102. For example, one server 102 could both request far memory from another server 102, and be a donor and allocate local memory 104 as far memory for another server 102. FIG. 2 thus depicts one such arrangement, among multiple possibilities.

The FMA 108 on the requesting server 102, requester 204 to the left in FIG. 2, enumerates as a remote memory controller with attached memory, which is mapped into the physical address space of the requester. By enumerating the FMA 108 as a NUMA (non-uniform memory access) node in one embodiment, the operating system or process in a server 102 can decide when to use far memory.

Accesses from the requester 204 server 102 to the FMA 108 in that server 102, for far memory access, are via physical addresses associated with FMA 108 operating as a remote memory controller. Accesses to these addresses are mapped by the FMA 108 to fabric addresses (in fabric address space 112, see FIG. 1) that are retrieved from one or more other FMAs 108 in the memory fabric, i.e., the FMA(s) 108 in the donor 206 server(s) 102. Inter-FMA communication through the load/store memory fabric 110 enables pages of far memory to be allocated by the donor 206 server 102, to the requesting node, i.e., the requester 204 server 102.

In some embodiments, address translation for incoming and/or outgoing accesses (mapping local physical addresses to fabric addresses) includes a device-side address translation cache, similar to a translation lookaside buffer (TLB), that is loaded based on access activity. FMA 108, operating in coordination with the running hypervisor or operating system, may also receive an indication, produced by the hypervisor or operating system during the handling of page fault, that a local physical address associated with FMA 108 will soon be accessed. This indication allows FMA 108 to pre-load the address translation for the indicated local physical address into the device-side address translation cache and/or begin the process of requesting an allocation of remote memory from the load/store memory fabric 110 prior to FMA 108 receiving the read/write to the indicated local physical address.

In one virtual address version, the hypervisor (e.g., VMM) in a donor 206 server 102 starts a process that allocates some or all stranded memory of that server 102, allowing the process to issue read/writes using virtual addresses. For example, the donor 206 server 102 could be allocating and operating virtual machines with virtual memory in a virtual computing environment implemented on physical processing and memory resources, including CPU(s) 106 and memory 104, of the server 102 where some portion of memory 104 is not assigned to a virtual machine and is therefore stranded.

Operating in accelerator mode, the FMA 108 in the donor 206 server 102 shares the virtual address space of the process, started by the hypervisor allowing the FMA 108 in the donor 206 server 102 to read/write to the previously stranded memory, i.e., portions of the memory 104 in the donor 206 server 102, and allocate the stranded memory as far memory. The FMA 108 in the donor 206 server 102 advertises available memory to other servers 102, receives load/store accesses from the memory fabric 110, and accesses memory allocated by the hypervisor using virtual addresses that, in some embodiments, may be translated to physical addresses on the device on behalf of requesting servers. Mapping the virtual address space of the process allocated by the hypervisor directly to the FMA's fabric address allows address translation for incoming accesses from the fabric, mapping fabric to virtual addresses. The above-described example hypervisor process has a virtual to physical pages table that is managed by the hypervisor in that server 102, which allows the hypervisor to seamlessly move physical memory, since the FMA 108 in that server 102 operates in the virtual address space. Hypervisor to FMA communication allows far server allocations to be relocated as necessary by allowing the hypervisor to request the FMA 108 relocate previously stranded memory as necessary. Inter-FMA communication enables the FMA 108 in the donor 206 server 102 to request that FMA 108 in the requester 204 server 102 relocate its memory to a different location, thereby allowing the memory to be reclaimed by the hypervisor.

In various embodiments of the FMA 108, the virtual address space used by the process the hypervisor is running is converted to a physical address that is used to access the memory. The page tables to do this are managed by the hypervisor (or OS if no hypervisor) and are "walked" by the processor's page tables walker and loaded into the TLB.

A fabric address coming in is converted to a virtual address through on-device address translation structures, e.g., page tables or on-device TLB implemented with content addressable memory (CAM). That virtual address is converted to a physical address on the FMA 108 either by the FMA 108 walking the system page tables or by requesting address translation through included services (such as those provided by CXL/PCIe). Alternatively, in some embodiments, if the processor supports this, those virtual addresses could also be used directly by the FMA 108 and the processor could do the address translation, like in OpenCAPI.

Thus in various embodiments, the address translation is:
  Done by the FMA 108 through page table walks or other mechanisms in coordination with the Hypervisor/OS.
  Done by the processor and the result returned to the FMA 108 for the FMA 108 to access the memory (e.g., CXL).
  Done by the CPU during an access that is issued by the device using the virtual address (e.g., OpenCAPI).

In one physical address version, the donor 206 hypervisor (VMM) in the server 102 informs the FMA 108 in that same server 102 which physical memory address ranges are not currently allocated to a virtual machine (stranded memory). Other versions could use non-virtualized operating systems. The FMA 108 in the donor 206 server 102 manages the stranded physical address space in cooperation with the hypervisor either at the page level or at the block level (or other level in further embodiments). The FMA 108 in the donor 206 server 102 allocates local memory 104 to far servers and bridges accesses to/from the load/store memory fabric 110. Incoming fabric addresses are translated to physical addresses on the FMA 108 in the donor 206 server 102 and the FMA 108 writes local memory 104 in the donor 206 server 102 directly using the physical addresses. Examples of how various embodiments of the FMA 108 translates addresses include address tables, page tables, translation lookaside buffers, etc. By writing directly to local memory, FMA 108 in the donor 206 server 102 prevents the accesses from the far server from being cached by the local CPU, preserving those resources for use by local processes.

Hypervisor to FMA 108 communication allows newly stranded memory to be added to the pool of physical addresses managed by the FMA 108. Hypervisor to FMA 108 communication also allows the hypervisor to reclaim physical memory managed by the FMA 108 by requesting the FMA 108 relocate any data currently in the desired physical address range such that the physical address range can be reallocated to a new virtual machine. Inter-FMA communication between the FMA 108 in the donor server and the FMA 108 in a requesting server enables data migration by allowing the FMA 108 in the donor server to request that the FMA 108 in the requester server move its data to another location.

Figure 3:
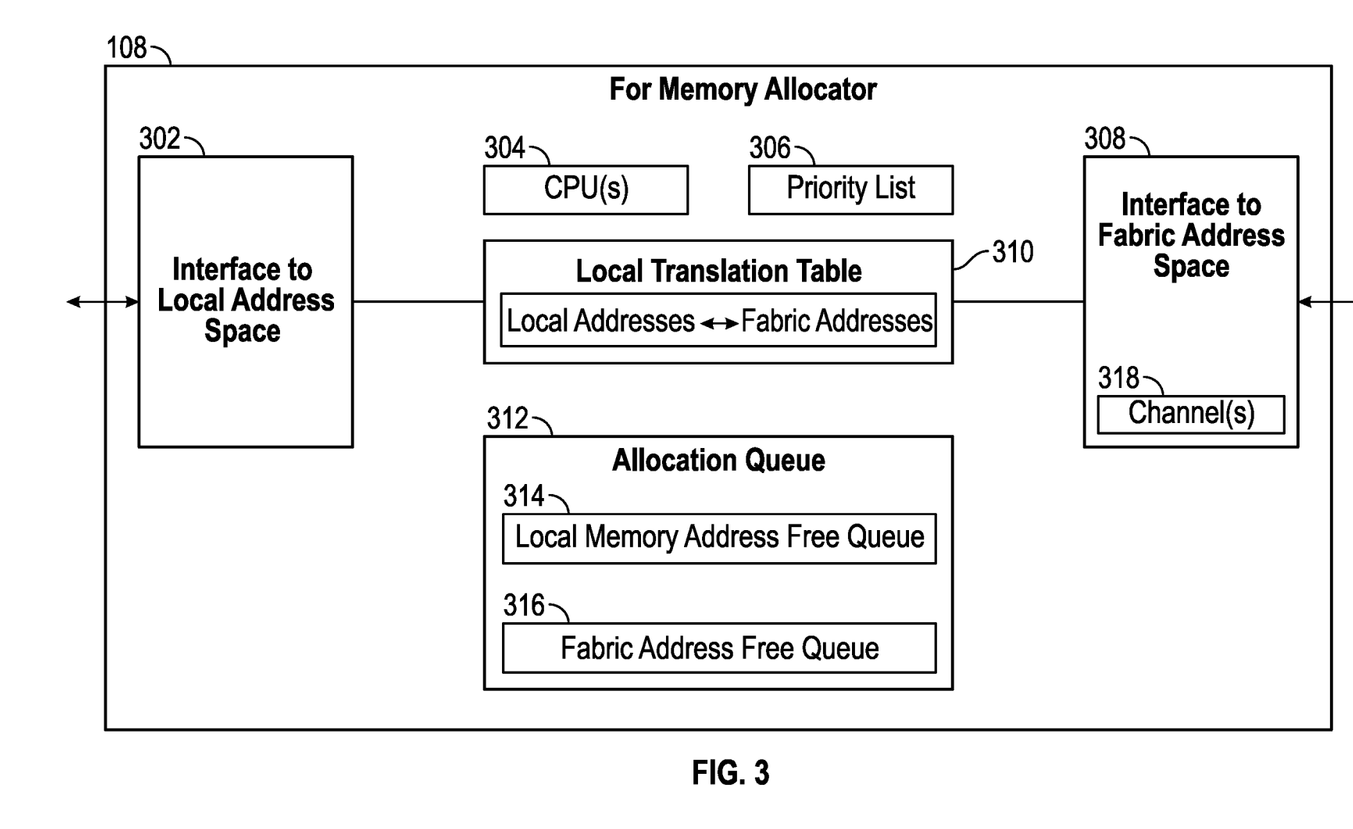
FIG. 3 illustrates an embodiment of a far memory allocator.

FIG. 3 illustrates an embodiment of a far memory allocator 108. Various functional blocks could be implemented in dedicated hardware, software executing on one or more CPUs 304 dedicated to the FMA 108 or shared with a server 102, e.g., CPU(s) 106, firmware, or combinations thereof in various embodiments. An interface 302 to local address space and an interface 308 to fabric address space connect to a local translation table 310, which translates local addresses to fabric addresses (and vice versa). See for example address tables 202 in FIG. 2. An allocation queue 312 is used by the FMA 108 to allocate local memory for use as far memory by other servers 102. In this embodiment, the allocation queue 312 includes a local memory address free queue 314, and a fabric address free queue 316. The address, or address range, of any portion of local memory 104 (see FIG. 2) that is available for allocation as far memory for use by another server 102 is placed on the local memory address free queue 314, and popped off the local memory address free queue 314 in response to inquiries about, or requests for, far memory allocation. A fabric address, or address range in fabric address space, that is available for allocation as far memory is placed on the fabric address free queue 316, and similarly popped off for such inquiries or requests. A priority list 306 is used by the FMA 108 to determine which of the other servers 102 is likely to have, or may have, stranded memory available for allocation as far memory for use by the requester 204 server 102 in which the present FMA 108 is located.

The interface 308 to fabric address space could have one or more channels 318, in various embodiments. For example, one channel could be for communication with other FMAs 108, such as to read allocation queues 312, and another channel could be for accessing far memory through fabric address space. Channels could be separated through address ranges in fabric address space 112, protocols, hardware, or combinations thereof. In one embodiment, address ranges and specific addresses in fabric address space 112 are assigned or allocated on a per FMA 108 basis.

Figure 4:
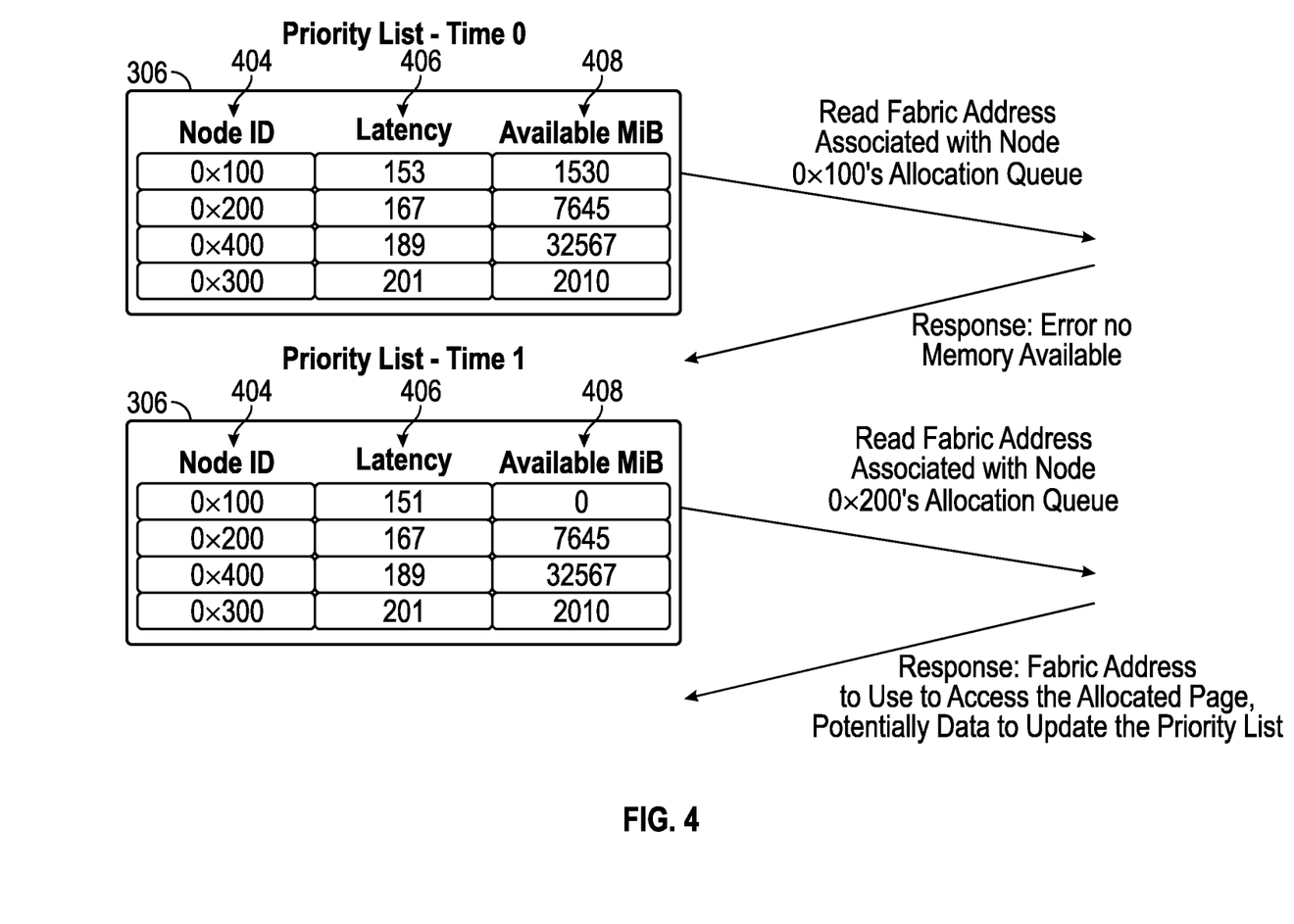
FIG. 4 illustrates an embodiment of a priority list that is suitable for use in the far memory allocator.

FIG. 4 illustrates an embodiment of a priority list 306 that is suitable for use in the far memory allocator 108. The priority list 306 is shown at two different instances in time, along with example communications from one FMA 108, in a requester 204 server 102 to another FMA 108 (not shown in FIG. 4, but see FIG. 2), in a donor 206 server 102. In this embodiment, the priority list 306 is populated with node IDs 404, each identifying a node or a server 102, latency 406 for each node ID 404, and available memory amount 408 for each node ID 404. The memory amount 408 is shown in numbers of mebibytes (MiB), where one mebibyte=1024 kibibytes=1048576 bytes, although other numbers or measurements of amount of available memory could be used in various embodiments. The latency 406 is shown in nanoseconds, and represents the time delay for accessing a specific allocation of far memory by the server 102 and far memory allocator 108 corresponding to a specific node ID 404, although other absolute or relative representations of latency 406 could be used in further embodiments.

In the scenario depicted in FIG. 4, at time 0 the priority list 306 in the requester 204 server 102 is sorted and indicates node ID 404 "0x100" has the lowest latency, 153 ns, and has, possibly, 1530 MiB as available memory amount 408. The far memory allocator 108 in the requester 204 server 102 consults the priority list 306, determines which node has available memory and lowest latency among the possibilities for available memory, then reads the fabric address associated with node 0x100's allocation queue 312 (i.e., the allocation queue 312 in the far memory allocator 108 in the server identified by that node ID 404), as a form of a request to a server 102 and associated far memory allocator 108 for allocation of far memory. The other far memory allocator 108 replies with a response that indicates there is an error, no memory is available for allocation as far memory, in this example.

At time 1, the far memory allocator 108 in the requester 204 server 102 has received the response and updated the priority list 306 to then show zero as the available memory amount 408 for the node ID 404"0x100". Next, the far memory allocator 108 in the requester 204 server 102 consults the priority list 306, determines the server 102 associated with node ID 404 "0x200" has possibly available memory and lowest latency among the possibilities for far memory allocation, and reads the fabric address associated with node 0x200's allocation queue 312. The far memory allocator 108 in the server 102 associated with node ID 404 "0x200" responds with a fabric address to use to access the allocated page(s) or other memory amount, and potentially data with which to update the priority list 306, for example available memory amount 408.

Figure 5A:
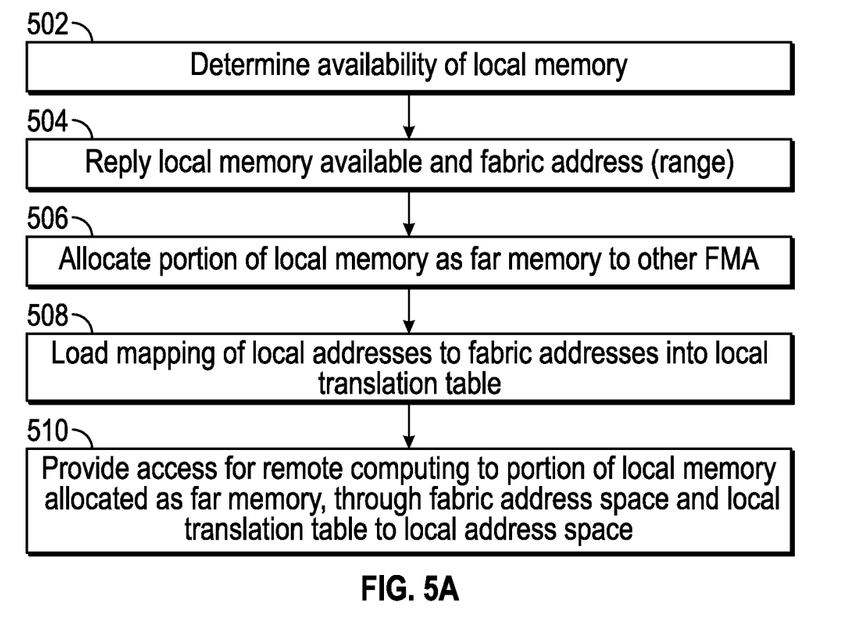
FIG. 5A is a flow diagram of a method of allocating local memory as far memory, as practiced by a far memory allocator.

FIG. 5A is a flow diagram of a method of allocating local memory as far memory, as practiced by a far memory allocator. For example, the far memory allocator practicing the method in FIG. 5A is located in a donor server, and functioning in cooperation with a processing device of the donor server, to allocate local memory of the donor server as far memory for another server.

In an action 502, the far memory allocator determines availability of local memory. Such availability is indicated on a local memory address free queue, in one embodiment, as an address or address range of local memory that is free or available for allocation as far memory.

In an action 504 the far memory allocator replies that local memory is available for allocation as far memory, and a fabric address or fabric address range is available for such allocation of far memory. This reply would be in response to a request from a requesting server, for far memory allocation. Such request could be in the form of reading the allocation queue, or more specifically the local memory address free queue and the fabric address free queue, of the present far memory allocator practicing this method in the donor server.

In an action 506, the far memory allocator allocates a portion of local memory as far memory to the other far memory allocator (in the requesting server).

In an action 508, the far memory allocator (present in the donor server) loads a mapping of local addresses to fabric addresses into the local translation table. This mapping is part of allocating local memory as far memory, and part of agreeing to or confirming allocation.

In an action 510, the far memory allocator provides access for remote computing to the portion of local memory allocated as far memory. The access is provided through the fabric address space and the local translation table to local address space. That is, the portion of local memory is accessed in local address space, i.e., address space local to the donor server, and the local translation table translates fabric address to local address, for such access. Remote computing, in the requesting server, accesses the far memory provided or allocated by the donor server. This access is received by the donor server, the fabric address is translated to a local physical address, and the donor FMA accesses the local memory and returns the response.

Figure 5B:
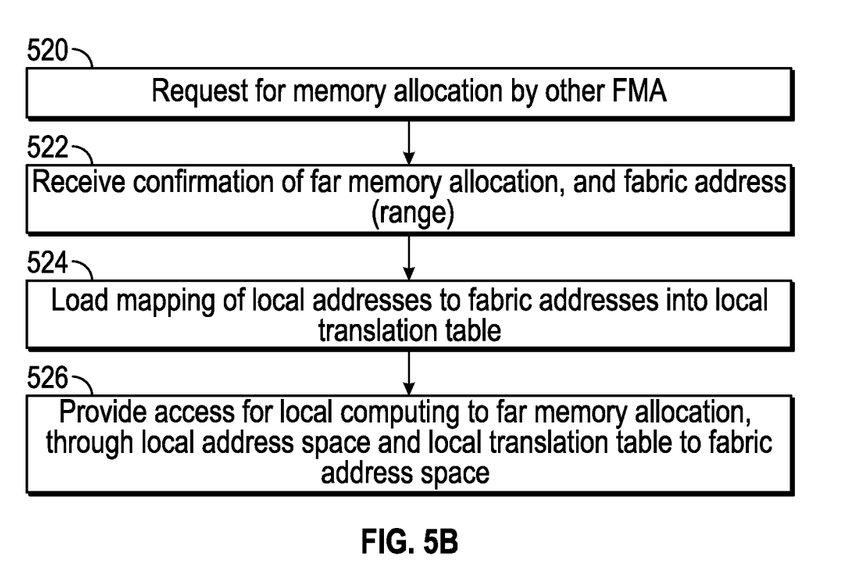
FIG. 5B is a flow diagram of a method of receiving a far memory allocation, as practiced by a far memory allocator.

FIG. 5B is a flow diagram of a method of receiving a far memory allocation, as practiced by a far memory allocator. For example, the far memory allocator practicing the method in FIG. 5B is located in a requesting server, and functioning in cooperation with a processing device of the requesting server, to receive an allocation of far memory from a donor server and a far memory allocator of the donor server.

In an action 520, the far memory allocator (in a requesting server) requests far memory allocation by another far memory allocator (in a donor server). Such request (alternatively, query or inquiry) could be in the form of reading the allocation queue of the far memory allocator in the donor server.

In an action 522, the far memory allocator receives confirmation of far memory allocation, and a fabric address or fabric address range. For example, the far memory allocator in the donor server sends back an indication that memory is available for far memory allocation, and a fabric address or fabric address range that can be used for such far memory allocation.

In an action 524, the far memory allocator (in the requesting server) loads a mapping of local addresses to fabric addresses into the local translation table. This mapping supports access by the requesting server to the local memory of the donor server that is allocated as far memory, with access for the requesting server occurring through local addresses translated to fabric addresses.

In an action 526, the far memory allocator (in the requesting server) provides access for local computing (in the requesting server) to far memory allocation (from the donor server), through local address space and local translation table to fabric address space. Local processes in the requesting server can access the allocated far memory using local addresses in the requesting server, which are translated to fabric addresses through the local translation table in the far memory allocator in the requesting server and are translated from those fabric addresses to local addresses in the donor server, by a local translation table in the far memory allocator in the donor server.

With reference to FIGS. 1-5B, various embodiments of the far memory allocator 108 have various combinations or all of the following features and implementations, for memory allocation. Each FMA maintains a list of local free memory as a queue that can be read by remote FMAs. For example, see the local memory address free queue 314 in FIG. 3. The queue is located at a static fabric address for each FMA, in some embodiments. For example, the local memory address free queue and/or the allocation queue could be located at a static fabric address specific to the FMA instantiation. Each FMA also maintains a priority list of other FMAs, in various embodiments, sorted such that the lowest latency memory has the highest priority and each line has information as to the amount of available memory on the remote FMA. For example, see the priority list in FIGS. 3 and 4. To allocate memory on a target server, an FMA issues a read (or load) to the fabric address associated with the allocation queue on the FMA for the target server, in various embodiments. See, for example, the scenario depicted in FIG. 4 and the allocation queue in FIG. 3. The remote FMA receives that read, and then selects a local memory address from a free queue, selects a fabric address from a different free queue, responds to the requesting FMA with the fabric address, and finally associates the local memory address and the fabric address in a local translation table, in various embodiments. For example, see the local memory address free queue, fabric address free queue, and local translation table in FIG. 3. The requesting FMA thus reads the allocation queue of one server and receives a back a fabric address to use to access the memory that is now reserved. If no memory is available on the donor, the read response indicates an error and the requesting FMA tries another server in its priority list. See, for example, the scenario depicted in FIG. 4 and the allocation queue in FIG. 3. The act of responding back to the requester indicates local memory is available and reserved by the donor. See, for example, the scenario depicted in FIG. 4.

For finding memory in the fabric, various embodiments of the FMA support commissioning, in which parameters are set up on the FMA. For example, during commissioning, the following parameters are saved on each FMA for all other remote FMAs. One parameter to save on the FMA for each other FMA is the fabric node ID/base address used for inter-FMA communication (queues etc.) See for example the priority list in FIG. 4. In one embodiment, Gen-Z has a 64-bit fabric address space in addition to 12 bits used for node ID, so that a portion or range of fabric address space, including one or more specific addresses, is unique to each node (e.g., server and FMA in that server). One parameter to save on the FMA for each other FMA is the approximate latency for an access. See for example the priority list in FIG. 4. One parameter to save on the FMA for each other FMA is the current amount of available memory. See for example the priority list in FIG. 4. Each FMA maintains a priority list of all other FMAs in the datacenter or other distributed system, using the above parameters, sorted based on policies applied during commissioning. Maintenance includes initializing, updating, and sorting the priority list. When a far memory allocation is requested, the highest priority FMA that meets the policies is selected from the priority list. For example, according to the priority list and a policy rule, the lowest latency FMA with <80% of its memory donated is chosen. Other selection rules and policies are readily developed in keeping with the teachings herein. During allocation/access of memory, the latency for the far FMA is timed to update the local priority list, in some embodiments. A timer is implemented in some embodiments of the FMA, for this purpose.

Embodiments of the FMA have various combinations of features to address allocation contention in the fabric of the distributed system, as described below. Each FMA in the fabric of the distributed system maintains a series of queues from which other FMAs read to allocate memory. For example, see the local memory address free queue and fabric address free queue in FIG. 3. These queues operate like stacks, and on successive reads of a particular queue or stack each FMA receives a different memory address. For example, one FMA reading the allocation queue of another FMA receives a fabric address for far memory allocation by that other FMA. A different FMA reading the same allocation queue of the other FMA receives a different fabric address for far memory allocation by that other FMA. If a queue is empty, the allocation will fail and the FMA seeking a far memory allocation will try the next FMA in its priority list. The priority queue is maintained as described previously.

As the percentage of allocated memory in the datacenter increases, FMA policies may need to be adjusted. For example, one or more of the parameters stored in each of the FMAs and used in the priority lists can be changed. Arrangement and use of memory for storing policies and/or various parameters is readily devised for embodiments of the FMA in accordance with the teachings herein.

VM deployment in the datacenter should consider far memory usage to ensure an optimal distribution of VMs throughout the datacenter. But, in some distributed system implementations, not all VMs will have access to far memory and not all servers will donate memory to the pool. FMA embodiments may have one or both of the following modes to share memory availability. In some embodiments, the mode is selectable. One mode for FMA sharing of memory availability is broadcast mode. In an example for broadcast mode, a source FMA creates a transmit node list and sends status information to its group of "neighbors". Neighbors could be determined multiple possible ways, for example through number of network hops, access latency, physical proximity, network architecture, etc.

One mode for FMA sharing of memory availability is multicast mode. In an example for multicast mode, each FMA sends a request message to selected source nodes from which the FMA wants to receive status via a memory read to those FMA's dedicated fabric addresses (e.g., a load/read). In a further embodiment, the request message is sent through a channel that is completely out of the fabric, for example through Ethernet, or an out of band channel. See for example channels in FIG. 3.

Policy options could control requests to sources based on one or more of the following conditions. One condition is a limit of maximum "radius" for source nodes, relative to a specific FMA. One condition is server types and configurations that determine eligibility to be a source node relative to a specific FMA. One condition is absolute latency and/or latency ranges for access, which determines eligibility to be a source node relative to a specific FMA. One condition is fabric path costs and number of hops in the fabric to another FMA, which determines whether that FMA is eligible to be a source node for a specific FMA. For example, policy options could be enforced on the priority list, see FIGS. 3 and 4.

The various component circuit blocks disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, the memory volumes, memory types, specific address field sizes, address translation schemes and the like may be different from those shown in alternative embodiments. Memory-pooling servers may be deployed in various organizations other than those shown. Additionally, interconnections between memory-pooling servers or internal components or blocks thereof may be shown as buses or as single signal lines. Each of the buses can alternatively be a single signal line (e.g., with digital or analog signals time-multiplexed thereon), and each of the single signal lines can alternatively be a bus. Signals and signaling links, however shown or described, can be single-ended or differential. Logic signals shown as having active-high assertion or "true" states, may have opposite assertion states in alternative implementations. A signal driving circuit or component is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. An integrated circuit device, comprising:
   a first memory to support address translation between local addresses and fabric addresses; and
   a processing circuit, operatively coupled to the first memory, the processing circuit to operate on a dynamic basis, as one of:
   a donor, that allocates a portion of first local memory of a local server as first far memory for access for a first remote server, and
   a requester, that receives an allocation of second far memory from the first remote server; and
   the processing circuit to bridge on a dynamic basis:
   as the donor, the access by the first remote server to the allocated portion of first local memory as the first far memory, through the fabric addresses and the address translation supported by the first memory;

as the requester, the access by the local server to the second far memory, through the address translation supported by the first memory, and the fabric addresses;

the processing circuit to:
generate a priority list comprising a plurality of node identifiers associated with a plurality of nodes and a plurality of memory availability indicators, for identifying far memory available for allocation from other servers;
determine, based on the priority list, that a first node of the plurality of nodes is associated with a lowest latency with respect to other nodes in the plurality of nodes; and
query the first node, from the priority list, for a fabric address to use to access a far memory allocation.

2. The integrated circuit device of claim 1, wherein the processing circuit is further to:
allocate the first far memory as the donor and receive the allocation of the second far memory as the requester; and
bridge, as the donor, the access by the first remote server to the first far memory and bridge, as the requester, the access by the local server to the second far memory.

3. The integrated circuit device of claim 1, wherein the processing circuit is further to:
generate an allocation queue, comprising a fabric address free queue and a local memory address free queue, to allocate the first local memory.

4. The integrated circuit device of claim 1, wherein the processing circuit is further to:
generate a local memory address free queue comprising one or more local memory addresses that are free, to allocate the first local memory; and
reply to indicate availability of far memory for allocation, responsive to receiving a request for far memory allocation and determining a local memory address that is free from the local memory address free queue.

5. The integrated circuit device of claim 1, wherein the processing circuit is further to:
generate a fabric address free queue, comprising one or more fabric addresses that are free, to allocate fabric addresses; and
reply with a fabric address that is free from the fabric address free queue, responsive to receiving a request, from the first remote server, for far memory allocation.

6. The integrated circuit device of claim 1, wherein the processing circuit is further to:
repeat allocating portions of local memory on a dynamic basis as further far memory for further servers, with corresponding mappings of address translation between the local addresses and the fabric addresses in a local translation table of the first memory, and
receive allocation of still further far memory from the further servers with further corresponding mappings of address translation between the local addresses and the fabric addresses in the local translation table, so that stranded memory in a distributed system is discovered and reallocated, by far memory allocators, including the integrated circuit device, as far memory.

7. The integrated circuit device of claim 1, further comprising:
an interface, for communication between the processing circuit, the first remote server, and further remote servers using fabric address space comprising the fabric addresses.

8. The integrated circuit device of claim 1, further comprising:
a first channel interface, to access far memory allocations among the integrated circuit device, the first remote server, and further remote servers using fabric address space comprising the fabric addresses; and
an out of band channel interface, to communicate information regarding allocation queues of the integrated circuit device, the first remote server, and the further remote servers.

9. The integrated circuit device of claim 1, wherein the local addresses comprise physical memory addresses and wherein the processing circuit is further to:
bridge the access by the first remote server to the local memory, through reading or writing the local memory using the physical memory addresses.

10. The integrated circuit device of claim 1, wherein the local addresses comprise virtual memory addresses and wherein the processing circuit is further to:
bridge the access by the first remote server to the local memory, through reading or writing the local memory using the virtual memory addresses.

11. The integrated circuit device of claim 1, wherein fabric address space comprises a plurality of fabric address ranges each specific to one of a plurality of far memory allocators including the far memory allocator, the first far memory allocator and the second far memory allocator.

12. The integrated circuit device of claim 1, wherein fabric address space comprises a plurality of fixed fabric addresses each specific to an allocation queue of one of a plurality of far memory allocators including the far memory allocator, the first far memory allocator and the second far memory allocator.

13. An integrated circuit device, comprising:
a memory to store a local translation table;
a first interface, for communication and to access local memory using local memory addresses;
a second interface, for communication with other far memory allocators, using fabric addresses; and
a processing circuit, operatively coupled to the memory, the first interface, and the second interface, the processing circuit to:
as a donor determine availability and allocate, on a dynamic basis, portions of the local memory, each as first far memory, to the other far memory allocators, and each with corresponding first mapping of first local addresses and first fabric addresses in the local translation table;
as a requester receive one or more allocations of portions of further local memory, each as second far memory, from the other far memory allocators, and each with corresponding second mapping of second local addresses and second fabric addresses in the local translation table;
generate a priority list comprising a plurality of node identifiers associated with a plurality of nodes and a plurality of memory availability indicators, for identifying far memory available for allocation from other servers;
determine, based on the priority list, that a first node of the plurality of nodes is associated with a lowest latency with respect to other nodes in the plurality of nodes; and
query the first node, from the priority list, for a fabric address to use to access a far memory allocation.

14. The integrated circuit device of claim 13, wherein the processing circuit is further to:

generate a local memory address free queue comprising one or more local memory addresses that are free, and use the local memory address free queue in determining the availability and allocating the portions of the local memory, and the first local addresses in each corresponding first mapping in the local translation table.

15. The integrated circuit device of claim 13, wherein the processing circuit is further to:
generate a fabric address free queue comprising one or more fabric addresses that are free, and use the fabric address free queue to allocate the portions of the local memory, and the first fabric addresses in each corresponding first mapping in the local translation table.

16. The integrated circuit device of claim 13, wherein the processing circuit is further to:
repeat determining availability and allocating, and receiving allocations of, far memory so that stranded memory in a distributed system is discovered and reallocated.

17. The integrated circuit device of claim 13, wherein the first interface is to access the local memory using physical memory addresses.

18. The integrated circuit device of claim 13, wherein the first memory interface is to access the local memory using virtual memory addresses.

19. The integrated circuit device of claim 13, wherein the second memory interface is for communication with the other far memory allocators using a fabric address space comprising fabric address ranges specific to each of such far memory allocators and fixed fabric addresses specific to allocation queues of such far memory allocators.

* * * * *